March 4, 1958    G. R. KEEHN ET AL    2,825,237
SETTING MECHANISM
Filed Oct. 17, 1956
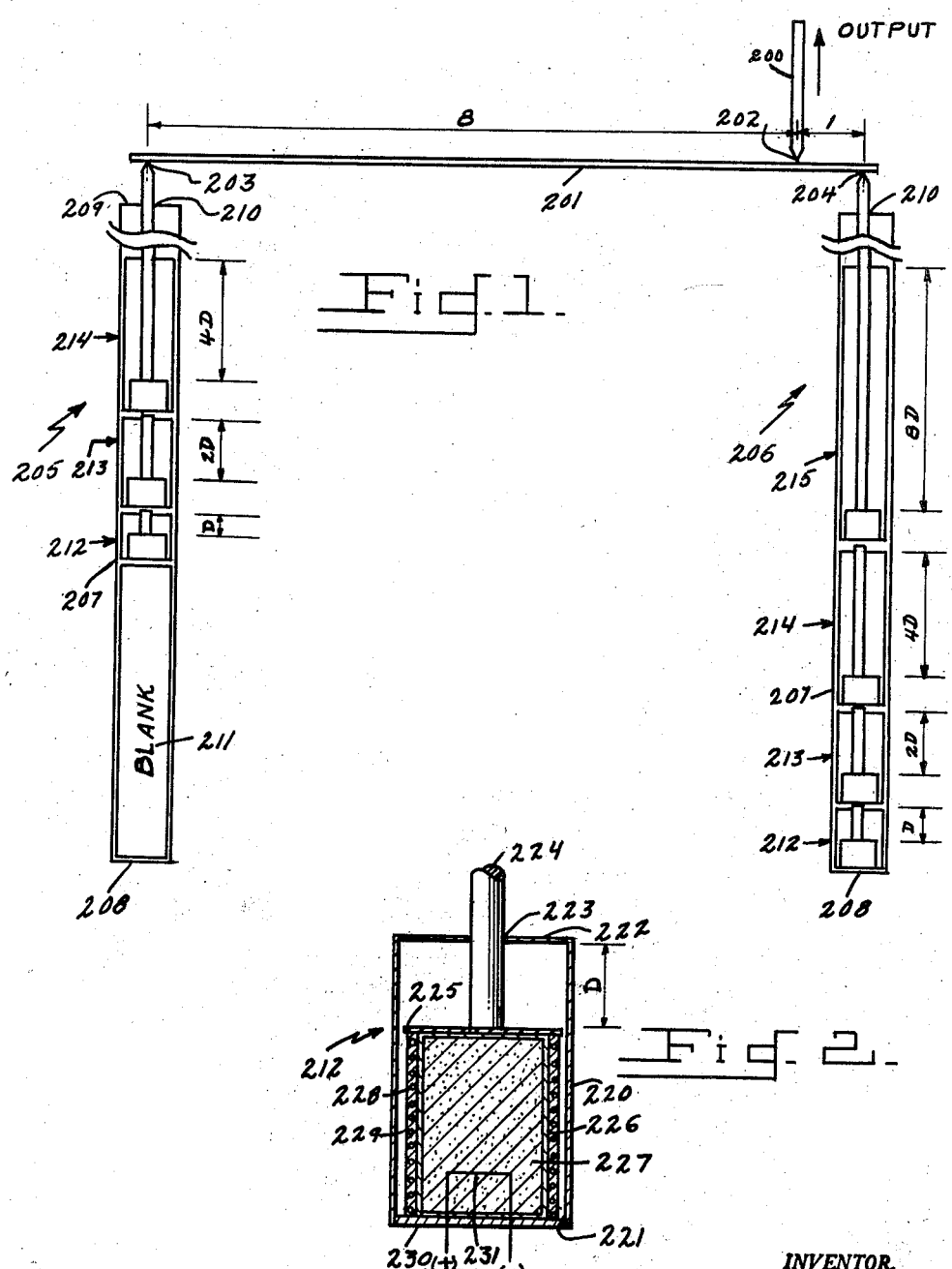
INVENTOR.
George R. Keehn
John G. Moorhead

United States Patent Office 2,825,237
Patented Mar. 4, 1958

2,825,237

SETTING MECHANISM

George R. Keehn, Washington, D. C., and John Gerald Moorhead, Silver Spring, Md., assignors to the United States of America as represented by the Secretary of the Army Application October 17, 1956, Serial No. 616,580

4 Claims. (Cl. 74—479)

(Granted under Title 35, U. S. Code (1952), sec. 266)

The invention described herein may be manufactured and used by or for the Government for governmental purposes without the payment to us of any royalty thereon.

This invention relates to an instantaneous setting mechanism and more particularly to a device capable of effecting any desired linear displacement in unit steps.

A principal object of this invention is to transmit any desired linear displacement from a displacement source.

Another object of this invention is to transmit any desired linear displacement, in unit steps, from a plurality of displacement sources, proportional to the actuation of one or all or any combination of the sources.

A further object of this invention is to transmit any desired linear displacement, in unit steps, from a plurality of variable displacement sources, proportional to the actuation of one, all, or any combination of the sources.

A still further object of this invention is to provide novel structure in arriving at the above mentioned objects.

In general, this invention comprises a plurality of linear displacement-effecting means having variable displacements, and an elongated transmitting member fulcrumed off-center and coupled with the displacement-effecting means. The arrangement of the transmitting member relative to the fulcrum and to the displacement-effecting members is such that unit displacement steps are experienced at the fulcrum in response to actuation of any of the plurality of linear displacement-effecting members.

This application is a companion application of application S. N. 614,994 filed concurrently herewith by the joint inventors of this application.

The specific nature of the invention as well as other objects uses and advantages thereof will clearly appear from the following description and from the accompanying drawing, in which:

Figure 1 is a schematic diagram illustrating the invention.

Figure 2 is an enlarged partial sectional view of a possible displacement-effecting means.

Referring to Figure 1, where like numerals indicate like parts, numeral 200 denotes an output rod of suitable cross section, fulcrumed or conveniently connected to an elongated lever 201, at bearing point 202. Lever 201 may be of various cross-sections and is preferably divided into a moment arm ratio of eight-to-one by output rod 200 and bearing points 203 and 204 as illustrated in Figure 1. In contact with bearing point 203 is displacement-effecting means 205. Contacting bearing point 204 is displacement-effecting means 206.

Displacement-effecting means 205 and 206 may comprise the same structural elements, but for convenience of explanation and illustration they are shown and described as having different components. Displacement-effecting means 205 may comprise a hollow cylindrical casing 207 which is suitably closed at end 208. Distal end 209 is conveniently formed with an opening 210, the purpose of which will become apparent from the description hereinafter set forth. Casing 207 has mounted therein blank 211, and displacement-producing assemblies 212, 213, and 214. Displacement-effecting means 206 is substantially similar to means 205 with the omission of blank 211 and the inclusion of another displacement-producing assembly. Thus, displacement-effecting means 206 may have displacement-producing assemblies 212, 213, 214 and 215.

In Figure 2, an example of a representative displacement-producing assembly, that may be used in combination with this invention, is shown in detail and as a partial longitudinal section of displacement-producing assembly 212. Assembly 212 may be of the explosive motor type having a hollow cylindrical barrel 220 open at end 221 and suitably closed at end 222. Closed end 222 has conveniently formed therein a opening 223 permitting reciprocal movement therethrough of piston rod 224. Piston rod 224 may be of any suitable cross-section, and is suitably connected to piston 225. Piston 225 is in abutting relationship with a squib comprising a closed cylindrical casing 226 conveniently housing a high heat generating explosive 227. Circumferentially mounted on casing 226 is a compressed spring 228 embedded in a low melting point lead 229 substantially as shown. Securely closing end 221 of barrel 220 is plug 230. The inner surface of piston 225 and inner surface of plug 230 bear against the ends of the squib. Explosive 227 may be detonated in any manner and as shown may be electrically detonated by passing a current through a filament 231. When explosive 227 is detonated, sufficient heat will be generated to melt the low melting point lead 229. Spring 228 will then be biased against plug 230 and piston 225 and will urge piston 225 towards end 222 of barrel 220. The distance that piston 225 travels before contacting end 222 is termed the displacement-producing means displacement and for motor assembly 212 is designated as D. Thus, D also determines the longitudinal displacement of piston rod 224. The displacement-producing means displacement is selectively varied for the plurality of motor assemblies utilized for reasons that will become apparent.

Referring to Figure 1 and more particularly to displacement-effecting means 205, motor assembly 212 having a displacement of D bears against inner surface of end 208 of casing 207. Motor assembly 213 having a displacement of 2D bears against the end of motor assembly 212 that presents the piston rod. Similarly, motor assembly 214 having a displacement of 4D and motor assembly 215 having a displacement of 8D are mounted internally of casing 207. As illustrated the piston rod of motor 215 is in bearing relationship with bearing point 204.

Displacement-effecting means 205 comprises a motor assembly 212 having a displacement of D, motor assembly 213 having a displacement of 2D, and motor assembly 214 having a displacement of 4D, each disposed similarly as the motor assemblies of displacement-effecting means 206. Blank 211 is employed to insure the relative bearing contacts between members and accordingly the piston rod of motor assembly 214 of displacement-effecting means 215 should be in contact with bearing point 203.

The displacement D is assigned any arbitrary or preferred unit of length. The numerous explosive motors may be electrically connected to selectively fire individually, together, and in any combination. The entire device may suitably be mounted in a convenient housing or casing (not shown) to insure the relative positioning of the parts and assure the desired linear displacements.

Reference may be had to the aforementioned companion application for possible casing structure.

In operation simultaneous actuation, firing or detonation of all the motor assemblies will produce the maximum output displacement of rod 200, whereas, actuation of motor assembly 212 of displacement-effecting means 205 will produce the minimum output displacement. By mathematical structural analysis it will be evident that 127 unit output steps or displacements are possible with the exemplary mechanism of this invention.

Other arrangements, with more displacement-effecting means and/or different numbers of motor assemblies in each effecting means, could be made, using more lever arms and/or different lever arm ratios. However, a lever arm ratio of eight-to-one and an arrangement of motor assemblies with their respective displacements as illustrated in Figure 1 are peculiarly adapted to produce unit displacements from zero to 127 to the output rod.

The displacement-effecting means 205 and 206 are illustrated as being in line, but it will be obvious that the necessary motor assembly displacements can be obtained by placing the displacement-effecting means in a stepped relationship. Numerous motors employing electromagnets or fluid pressure or compressed air can be used without departing from the spirit of this invention.

The mechanism of this invention can be applied to setting various timing devices. Computers and similar devices can utilize the mechanism and principles of this invention.

It will be apparent that the embodiments shown are only exemplary and that various modifications can be made in construction and arrangement within the scope of the invention as defined in the appended claims.

We claim:

1. A device comprising: an output means; a transmission means comprising an elongated member being fulcrumed off-center by said output means; a first displacement-effecting means having a plurality of displacement-producing means; a second displacement-effecting means having a plurality of displacement-producing means; said first displacement-effecting means in cooperative relationship with one end of said member and said second displacement-effecting means in cooperative relationship with the other end of said member; said displacement-producing means adapted to be selectably actuated individually, together, and in any combination of said producing means; whereby said output means is adapted to be displaced in unit steps proportional to the selective actuation of said displacement-producing means.

2. A device as in claim 1 wherein said displacement-effecting means is adapted to produce displacements of $2^nD$, D being a unit of length and $n$ being a whole number.

3. A device as in claim 1 wherein actuation of all of said displacement-producing means will result in maximum displacement of said output means and a fractional part of said maximum displacement is obtained when a selective number of displacement-producing means are actuated.

4. A device comprising: an output means, a transmission means comprising an elongated member having a fulcrum dividing said member into a longer and shorter moment arm having a respective ratio of 8:1, said output means bearing on said member at said fulcrum; a first displacement-effecting means at the end of said member having the longer moment arm; a second displacement-effecting means at the end of said member having the shorter moment arm; said first displacement-effecting means having a plurality of displacement-producing means capable of producing displacements of $2^nD$; said second displacement-effecting means having a plurality of displacement-producing means capable of producing displacement of $2^nD$; D being a unit of length and $n$ being a whole number; said displacement producing means adapted to be selectively actuated individually, together, and in any combination of said producing means; whereby said output means is adapted to be displaced in unit steps proportional to the selective actuation of said displacement-producing means, maximum displacement of said output means being obtained upon actuation of all of said displacement-producing means.

References Cited in the file of this patent

UNITED STATES PATENTS

| 1,517,681 | Lucey | Dec. 2, 1924 |
| 2,342,691 | Plensler | Feb. 29, 1944 |
| 2,498,309 | Svoboda | Feb. 21, 1950 |